United States Patent
Norlander et al.

(10) Patent No.: US 8,892,553 B2
(45) Date of Patent: Nov. 18, 2014

(54) AUTO-GENERATION OF EVENTS WITH ANNOTATION AND INDEXING

(75) Inventors: Rebecca Norlander, Bellevue, WA (US); Anoop Gupta, Woodinville, WA (US); Bruce A. Johnson, Woodinville, WA (US); Paul J. Hough, North Bend, WA (US); Mary P. Czerwinski, Woodinville, WA (US); Pavel Curtis, Bellevue, WA (US); Raymond E. Ozzie, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1390 days.

(21) Appl. No.: 12/141,625

(22) Filed: Jun. 18, 2008

(65) Prior Publication Data
US 2009/0319482 A1 Dec. 24, 2009

(51) Int. Cl.
*G06F 7/00* (2006.01)
*G06F 17/30* (2006.01)
*G11B 27/034* (2006.01)
*G11B 27/10* (2006.01)

(52) U.S. Cl.
CPC ........ *G06F 17/30817* (2013.01); *G11B 27/034* (2013.01); *G11B 27/105* (2013.01)
USPC .................... 707/736; 707/E17.028; 715/723

(58) Field of Classification Search
USPC .................. 707/999.003, 705, 736, E17.028; 715/723
See application file for complete search history.

(56) References Cited

U.S. PATENT DOCUMENTS

| | | | |
|---|---|---|---|
| 5,664,227 A * | 9/1997 | Mauldin et al. | 715/203 |
| 6,404,925 B1 * | 6/2002 | Foote et al. | 382/224 |
| 6,546,405 B2 | 4/2003 | Gupta et al. | |
| 6,956,593 B1 * | 10/2005 | Gupta et al. | 715/751 |
| 7,134,079 B2 | 11/2006 | Brown et al. | |
| 7,162,690 B2 | 1/2007 | Gupta et al. | |
| 7,243,301 B2 | 7/2007 | Bargeron et al. | |
| 7,823,056 B1 * | 10/2010 | Davey et al. | 715/202 |
| 7,847,815 B2 * | 12/2010 | Patel et al. | 348/14.08 |
| 2004/0008970 A1 | 1/2004 | Junkersfeld et al. | |
| 2005/0091579 A1 | 4/2005 | Mewherter et al. | |
| 2005/0223314 A1 | 10/2005 | Varadarajan et al. | |
| 2005/0283752 A1 * | 12/2005 | Fruchter et al. | 717/100 |
| 2006/0288273 A1 | 12/2006 | Erol et al. | |
| 2007/0150512 A1 * | 6/2007 | Kong et al. | 707/104.1 |
| 2007/0201815 A1 * | 8/2007 | Griffin | 386/52 |

(Continued)

OTHER PUBLICATIONS

Ranjan et al, "Improving Meeting Capture by Applying Television Production Principles with Audio and Motion Detection", Apr. 2008.*

(Continued)

*Primary Examiner* — Brannon W Smith
(74) *Attorney, Agent, or Firm* — Dan Choi; Judy Yee; Micky Minhas

(57) ABSTRACT

Recording of various events in a video format that facilitates viewing and selective editing are provided. The video can be presented in a wiki-format that allows a multitude of subsequent users to add, modify and/or delete content to the original recorded event or a revision of that event. As edits and annotations are applied, either automatically or manually, such edits can be indexed based on criteria such as identification of an annotator, a time stamp associated with the edit, a revision number, or combinations thereof. The edits or annotations can be provided in various formats including video, audio, text, and so forth.

20 Claims, 10 Drawing Sheets

(56) References Cited

U.S. PATENT DOCUMENTS

| | | | |
|---|---|---|---|
| 2008/0209480 A1* | 8/2008 | Eide et al. | 725/87 |
| 2008/0281592 A1* | 11/2008 | McKoen et al. | 704/235 |
| 2009/0164572 A1* | 6/2009 | Charlton et al. | 709/204 |
| 2010/0039564 A1* | 2/2010 | Cui et al. | 348/700 |

OTHER PUBLICATIONS

Wang et al, "Gesture Tracking and Recognition for Lecture Video Editing", 2004.*

Richter et al, "Integrating Meeting Capture within a Collaborative Team Environment", 2001.*

Wu et al, "Vision-Based Gesture Recognition: A Review", 1999.*

Zhang et al, "MyView: Personalized Event Retrieval and Video Compositing from Multi-camera Video Images", 2007.*

Ju et al, "Analysis of Gesture and Action in Technical Talks for Video Indexing", 1997.*

Merlino et al, "Broadcast News Navigation using Story Segmentation", 1997.*

Ju, et al. Summarization of Videotaped Presentations: Automatic Analysis of Motion and Gesture. Last revised May 30, 1998. http://www.jgaa.info/~black/Papers/ju98.pdf.

Nijholt. Towards the Automatic Generation of Virtual Presenter Agents. http://inform.nu/Articles/Vol9/v9p097-110Nijholt78.pdf. Informing Science Journal, vol. 9, 2006.

West, et al. Content Exposure of Slide Show Presentations for Selective Download and Annotation via Mobile Devices. http://www.mlearn.org.za/CD/papers/West.pdf. Last accessed on Aug. 21, 2007.

* cited by examiner

AUTO-GENERATION OF EVENTS WITH ANNOTATION AND INDEXING

BACKGROUND

Computing devices can be accessed at almost any time and any place and can contain a tremendous amount of information relating to people, organizations, general interests, personal events, and numerous other situations. These computing devices can be utilized to record various activities or other events and to share those recorded activities with others.

As it relates to organizations, meetings and other events should allow participants the opportunity to achieve common goals while mitigating wasted time, regardless if the attendees are sitting around a table or around the country. In addition, meetings should be more than merely isolated events but should be a piece of an overall collaborative framework or organizational goal. Further, attendees should have access to the most accurate, up-to-date information as well as information that is accessible by all participants in order to help the team as a whole perform at a higher level of efficiency.

An example of an activity is an organization meeting that is intended for participants located at a single site or at multiple sites across the country or across the globe. Due to various availability situations, not all participants might be able to attend the meeting. Similarly, there can be input from uninvited individuals that might be an important addition to the meeting. Those unable to attend or those that were not invited can view a recorded meeting and any comments or other information relating to the meeting must be submitted in a separate format (e.g., phone call, email, and so forth). Not all persons that should receive the separately submitted information might receive the information due to distribution issues as well as other issues. This can produce inefficiencies as well as various participants not being informed of the latest developments.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with recording an event and allowing others to review the recorded event and/or annotate information to the event. A meeting or presentation can be recorded and played back to allow annotating with comments, corrections, questions and/or answers, as well as other information.

According to some aspects, automatic annotation of the event is captured based, in part, on indicators that are dynamically recognized and captured. Indicators include, but are not limited to, keywords in a speech, text, hand gestures, body language, and so forth. In some aspects, individuals viewing the recorded event can input the annotations for review by others. For example, the event can be annotated with information such as "these 10 seconds are interesting" or "review the next 5 minutes carefully." A next user that desires to view the presentation might not have enough time to view the presentation in its entirety. Thus, relying on the annotations, the next user can view the "important" sections, saving time and improving efficiency.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
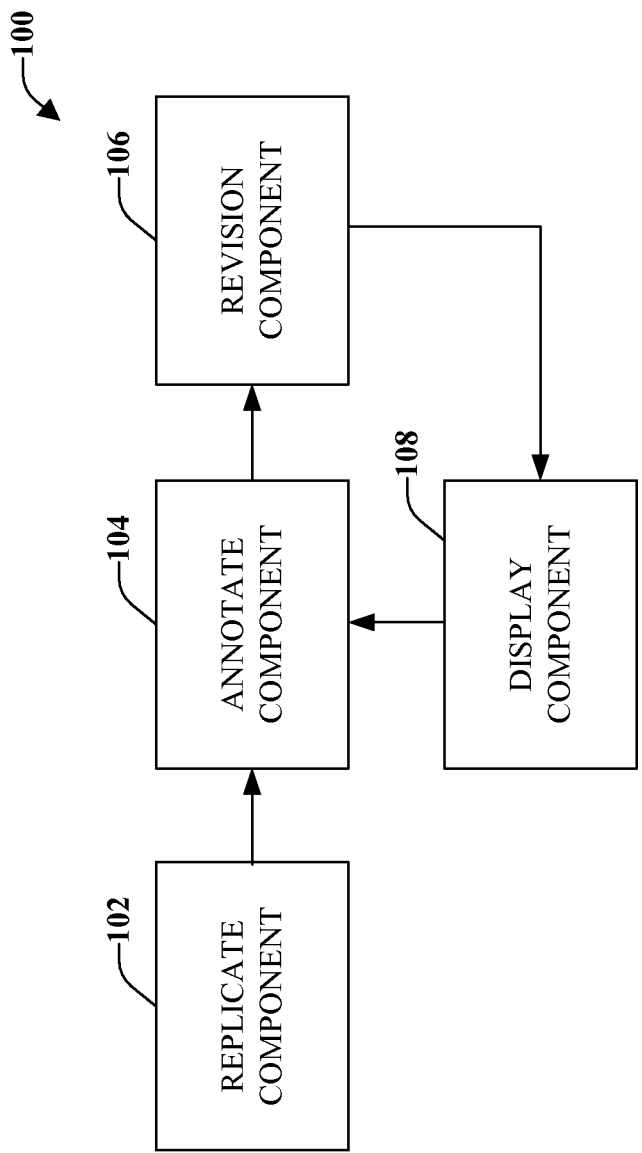
FIG. 1 illustrates a system for automatically capturing and annotating a video version of an event.

Referring initially to FIG. 1, illustrated is a system 100 for automatically capturing and annotating a video version of an event. With the vast amount of technological advances available, including the Internet and file sharing, many individuals desire to capture events for later viewing and/or sharing with others. This can allow those that might not have been able to participant in the event, or those who want to review it for other reasons, to have access to the event. System 100 can be configured to automatically annotate the event based on indicators that initiate the automatic annotation. Additionally or alternatively, system 100 can be configured to allow those participating in the event or those viewing it at a later time to access and, if desired, annotate information to the event. The annotations can include, but are not limited to, providing comments, notes, questions, additional information, correction of factual errors, observations, thoughts and/or other content. Annotations can also include adding or appending content to the event as well as modifying and/or deleting at least a subset of the content (including content included in previous annotations), and/or other functions. System 100 can further be configured to index the content to allow searching for a particular portion of the content, a particular annotator, a date of the revision, and so forth.

In further detail, system 100 includes a replicate component 102 that can be configured to capture a video version of an event. The captured event can be any event that a user desires to retain for later viewing and/or editing (e.g., meeting, presentation, speech, home movies, and so on). Capturing the event can include recording a video of the event that can contain multiple streams of data, such as one stream for the visual content, another stream for the audio content, a further stream for text entry, and so forth. Capturing the event can also include distinguishing among participants in the event, which can be facilitated by manual entry (e.g., manually associating a name with a face and/or voice) or automatic recognition (e.g., facial, speech). Replicate component 102 can further be configured to associate a time stamp (e.g., day/time) with the content at substantially the same time as the event is recorded. Thus, portions of the event can be accessed based on the time stamp information.

An annotate component 104 can be configured to accept one or more edits to at least a portion of the captured event. The edits can be received at substantially the same time as the event is captured, at a later time, or any combination thereof. For example, as a user is participating in the event or viewing the event at a later time, the user might desire to contribute to the content in various fashions by editing or appending to the content. The one or more edits can include verbal comments, video comments, written comments, as well as other forms of comments, questions, animations, graphics, and so forth (e.g., video format, audio format, text format).

In accordance with some aspects, automatic annotations can be applied to the captured event based, in part, on various indicators or cues. The indicators or cues can be observed and captured by replicate component 102 and annotate component 104 can apply various rules or policies associated with the indicator. The various indicators can include hand gestures, body language, text, keywords in a speech, or combinations thereof, as well as other indicators. For example, as the event is being recorded by replicate component 102, annotate component 104 can recognize certain indicators such as the words "in conclusion", "the key of this [event]", "in summary" "the main purpose" or other salient high points of the event. These words or phrases can be predefined, such that upon recognizing those words or phrases an automatic action is applied, such as automatically annotating or highlighting that portion of the event.

The captured event and the one or more edits or annotations can be compiled by a revision component 106 that can be configured to rewrite the original captured event with the one or more edits to create a revised event. In accordance with aspects that automatically capture the annotation at substantially the same time as the event is captured, revision component 106 can be configured to mark or otherwise designate the point in the event where the annotation occurs.

Thus, revision component 106 can combine the one or more edits (or annotations) with the captured event and rewrite the capture event into a first (second and so on) revised event. There can be multiple revised events that correspond with the number of times annotations (e.g., additions, modifications) are to be included in (or deleted from) the original captured event or a previously annotated version of the event. In accordance with some aspects, each annotation is appended to the previous annotation, allowing a user to perceive all edits at substantially the same time. In accordance with some aspects, revision component 106 appends the one or more edits to the captured event sequentially to create multiple revised events. The original captured event and the revisions can be cataloged or indexed to allow a search based on various parameters. Such parameters can include an identification of a user that provided the annotation, a time stamp associated with the annotation, a revision number of the annotation, or combinations thereof.

Thus, the annotated comments can be mixed or commingled with the original content (or a previous revised (rewritten) version of the content). The rewritten content can be retained for further review, editing, annotation, or for other actions, though interaction with a display component 108. Further, display component can render (e.g., audibly, visually) the captured event or one or more revised events when a request for the event is received. In accordance with some aspects, multiple versions of the captured event are retained to allow users to perceive an earlier version and/or the original version depending on what the user is interested in viewing. A user can review the original content or particular annotations (e.g., a specified annotator, specific comments, and so forth). Thus, display component 108 can allow users, other than the user that contributed content and/or the one or more edits, to view the content and the edits. In accordance with some aspects, display component 108 renders the requested content though the Internet or through other means of proving the content to disparate users (e.g., local area network, personal area network, wide area network, wireless communication systems, and so forth).

According to some aspects, annotate component 104 can lock the event or at least a portion of the event so that edits are not available to be made to the event or at least a portion thereof. The lock can be associated with all users or with selected users that are specifically identified. Additionally or alternatively, the lock might restrict the edits to a particular format (e.g., audio, visual, text, and so forth). Thus, the lock can restrict access to one or more selected users (that are predefined or that cannot provide the proper access level credentials), restrict edits to a particular format (e.g., only verbal edits are allowed), or combinations thereof.

By way of example and not limitation, while an event is being captured in video format, a participant can annotate the event with a document that provides supplemental information. The participant can mark a point within the event (e.g., based on a time stamp) and include the document at that point, which might be inserted during the capturing of the event or after the event. In a delayed viewing scenario, a user can perceive the entire event and add annotations at the beginning, end, or any portion there between. The user might desire to selectively pause or halt the playback of the event and add content. For example, as a user perceives the event, a pause button or other interface can be selected to temporarily pause or halt the playback. The user can enter information, such as "The last three points are important to our case because point A is similar to the field problem we had two months ago, . . . ". Thus, when a subsequent user perceives the revised event, the subsequent user can perceive both the original event and the comments (e.g., three points in above example) added by an earlier annotator or by a participant at the event.

In such a manner, subsequent users can selectively add, modify and/or delete content to the event. The annotations can be incorporated into a previous version (original event or revised event) and made available so that other users can review and/or provide further annotations. In accordance with some aspects, if there are problems with a particular revised version (e.g., misleading content, inappropriate content, corrupt version, and so forth) system 100 automatically reverts to the previous version. In accordance with some aspects, system 100 can revert to a previous version based on a particular edit being deleted or based on other manually received information (e.g., only show the edits to identified users or a group of users).

Figure 2:
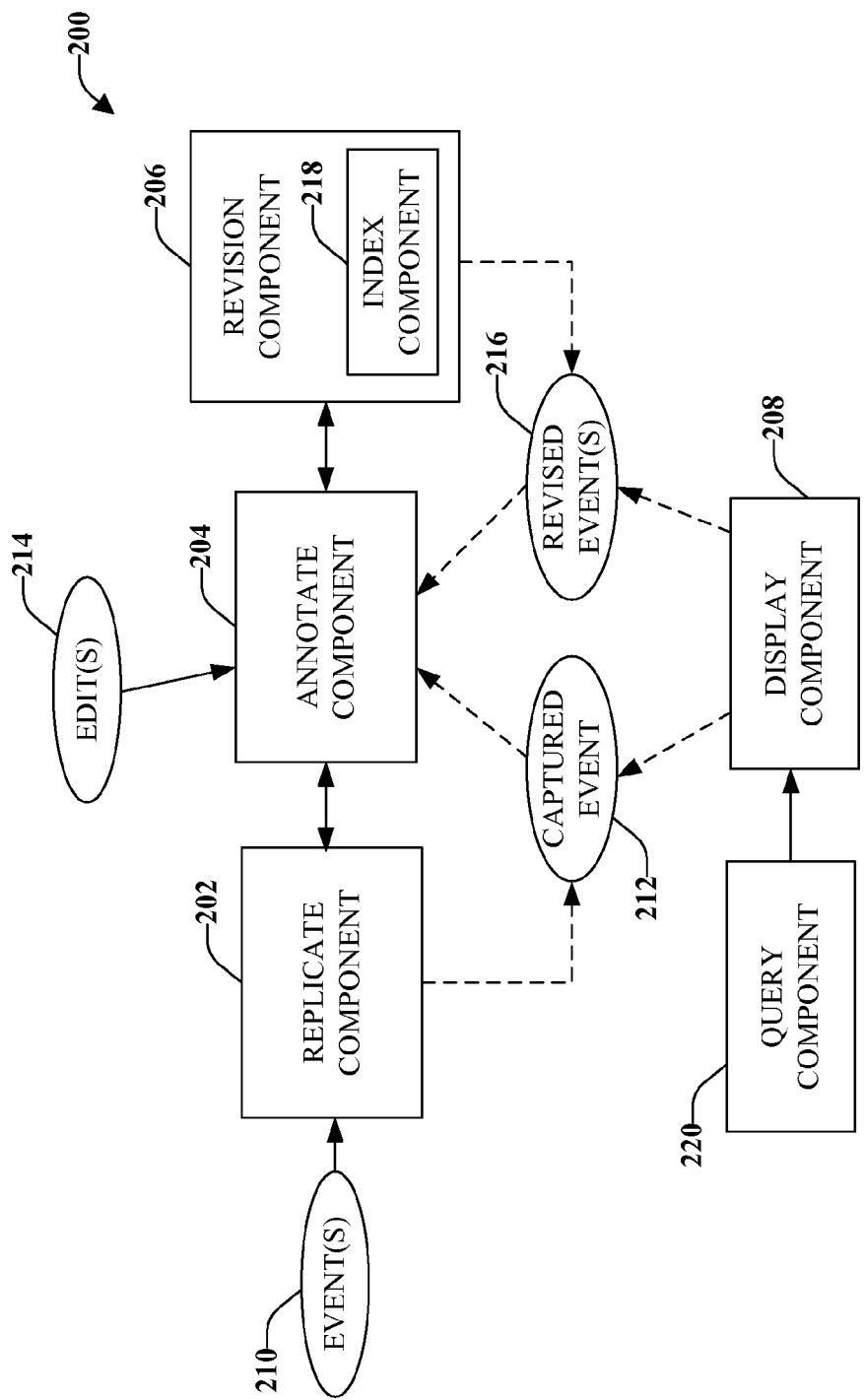
FIG. 2 illustrates a system for auto-generation of an event with annotation and tagging.

FIG. 2 illustrates a system 200 for auto-generation of an event with annotation and tagging. The event can be captured and annotated in a real-time automatic manner. For example, if an important fact or item is discussed (e.g., during a presentation) or if there is follow-up needed on a particular aspect, that moment can be annotated, such as by receiving a manual selection of an option to annotate the captured information. The specified location in the overall video-feed can be annotated with a reference, which can be input as a separate stream of text data, for example. Information can be cataloged automatically in this manner as a function of what the user(s) desire to maintain. The entire event can be maintained in a single file, but, in accordance with some aspects can be separated by the annotations and/or can be maintained in multiple files.

According to some aspects, a portion of the event is automatically annotated based on various triggers or indicators (e.g., key words, hand gestures, body language, and so forth). For example, during an event, such as a meeting, there can be breaks every few hours. A trigger can be when the participants begin to leave the room, the discussion ends (e.g., lead speaker sits down or leaves the room), or when a multitude of conversations commence. Such triggers can indicate that the capturing of the event should be automatically paused or stopped. The recording can automatically be annotated to indicate a break in the meeting so that a user viewing the meeting at a later time understands the reason for the disconnect in the conversation. If the recording of the event is automatically paused, the recording can automatically restart when the majority of the participants are in the room, when the speaker restarts the meeting, or other triggers.

System 200 can provide a wiki-type experience relating to video content. A wiki is a type of computer software that allows users to create and/or modify web pages easily. Collaborative websites, such as an encyclopedia websites, can be created though wikis. System 200 further provides a video-wiki type experience.

In more detail, system 200 includes a replicate component 202 that can be configured to receive at least one event 210, which can be anything that can be recorded in a video format. The information captured by replicate component 202 is referred to as a captured event 212, which can be retained in a storage media in a retrievable format.

A user can submit a request to review the captured event 212 (or a revised event) and, if desired, can provide one or more edits 214. An annotate component 204 can be configured to receive the edit(s) 214. In accordance with an aspect, the edit(s) 214 can be received at substantially the same time as the event 210 is captured. In accordance with some aspects, the replicate component 202 can record a time stamp in conjunction with the captured event 212 and an annotate component 204 can accept one or more edits based on a time triggered from the time stamp.

For example, a business meeting is being conducted and, during the meeting, a participant realizes that information is needed from someone not participating. The participant can enter an edit 214, such as through a user interface, that notifies system 200 to mark or index that place in the video. A comment can be inserted at that point, such as, "Bill please provide us with the statistics relating to last year's shipments." Thus, at a later time the missing information can be provided and annotated to the original content. The person that needs to find the location to enter the missing information can utilize indexing functionality to jump to the correct location within the video.

At substantially the same time as the edit(s) 214 is received, a revision component 206 rewrites the captured event to include the edit(s) 214, and outputs a revised event 216. An index component 218, associated with revision component 206, can be configured to catalog each of the one or more edits 214 at substantially the same time as the revised event 216 is created or at a different time. The catalog or categorization can be based on a user that provided the edits 214. The user can be identified by a user name, screen name, Internet Protocol address, or based on other criteria (e.g., screen name, nickname, and so forth). In accordance with some aspects, the edit can be cataloged based on a time stamp (e.g., day/time combination) that indicates when the edits 214 were received. The time stamp of the edits 214 can be utilized if a user desires to review the edits 214 in a sequential order or for other reasons. In another example, there might be a question relating to circumstances relating to a particular edit and the actual time stamp can be reviewed to probe recollection of the factors and conditions that might have influenced a particular edit. In accordance with some aspects, the index component 218 can catalog the various edits based on both the users that provided the edits and the time the edits were received as well as based on other information.

A user desiring to perceive a captured event and/or associated revised events can input search terms into a query component 220 (which can be a user interface component). The search terms can be a request for a particular editor, a particular day and/or time the edit was received, or based on other factors, which includes the catalog developed by index component 218. By searching for various user names, key words or phrases, time stamps, etc. a user can quickly find and review portions of the events 212, 216, mitigating the need to review the entire content associated with the event. The search can be enabled for the original event or for one or more edits based on the catalog. In accordance with some aspects, the original events and any subsequent revised events can be searched at substantially the same time, which can allow for tracking of changes between the various captured and revised events.

The presented event 212, 216 can be subsequently and/or continuously edited. In a wiki-type situation, a number of users (e.g., community) can have access to the video events and can provide annotations or edits. The community might be a family unit, members of a club, an organizational department, a religious organization, a government agency, and so forth. The wiki-type situation allows the users that have access to the events and the ability to provide annotations to continuously update the event. This can result in a better experience by having more relevant and up to date information available.

In accordance with some aspects, the community might be open to anyone with access to the Internet, thus providing a community website for annotation of important events (e.g., scientific presentation relating to global warming, presidential debates, and so forth). An advantage to a video-wiki accessible by a large numbers of users is that some of the users may be specialists that can maintain up-to-date information. However, a downside can be that there are many users that are not specialists and might input misleading or erroneous information, and, therefore, the community website should be monitored to mitigate inclusion of such content. System 200 can automatically monitor the information, such as by monitoring for key words, phrases, or visual content and/or the information can be monitored by subsequent users. The monitoring can include flagging the data as incorrect, obscene, and so forth. Such flagged data can then be easily reviewed and removed if necessary.

Figure 3:
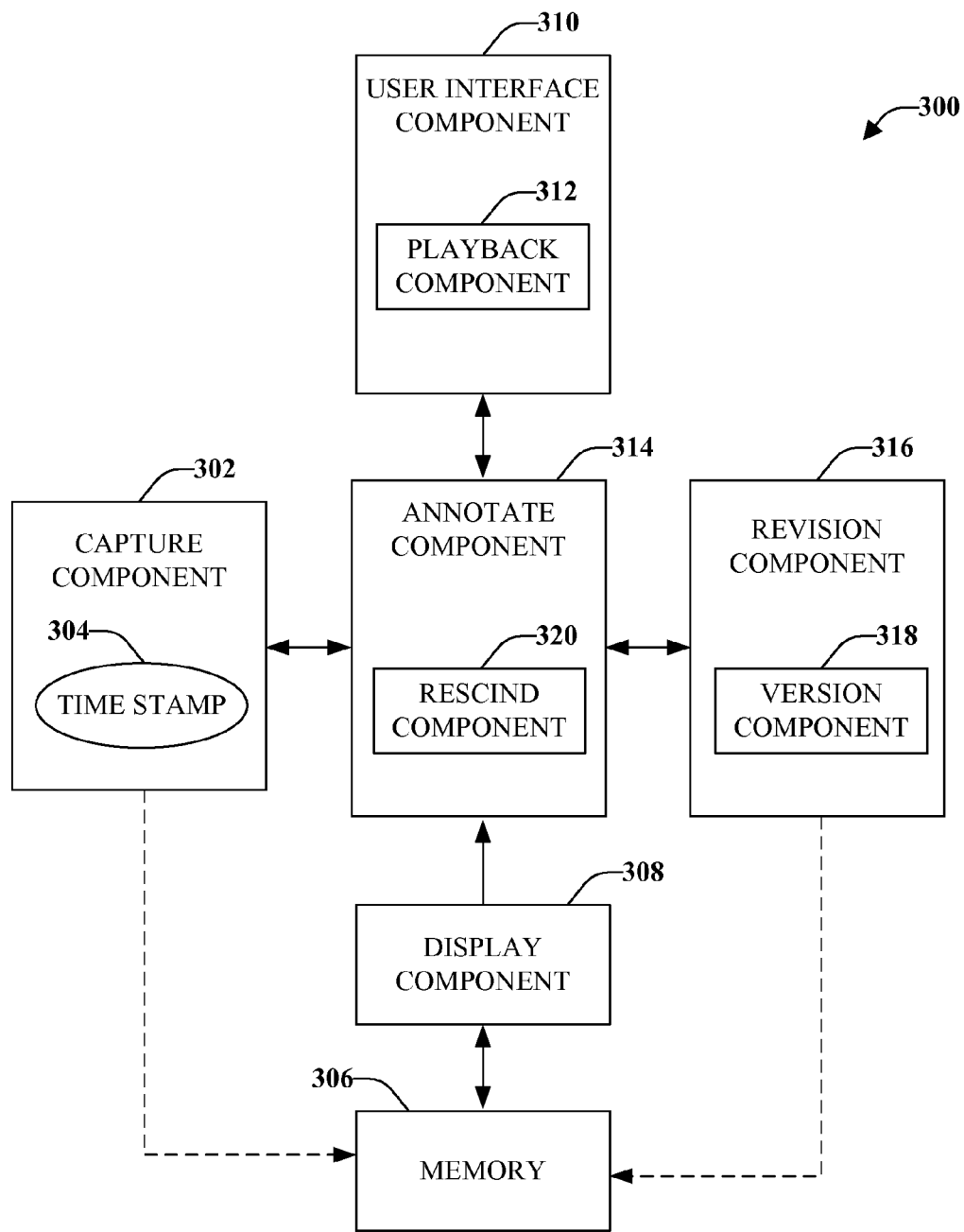
FIG. 3 illustrates another system for providing a presentation or other event that is recorded for play back in a video format.

FIG. 3 illustrates another system 300 for providing a presentation or other event that is recorded for play back in a video format. The presentation or event can be presented to allow users to add, modify and/or delete content and/or to navigate though the event. System 300 includes a capture component 302 that can be configured to document an event in a video format. As the event is captured, a timestamp 304 can be associated with each frame or portion of the event or high points of the event.

The captured event can be maintained in a memory 306 and/or some other medium that can store information. By way of example, and not limitation, the memory 306 can include nonvolatile and/or volatile memory. Suitable nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of example and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

As one or more users become aware of the captured event, there might be a desire to provide more content, correct content that is incorrect, delete content, and so forth. A user can request the content, which can be rendered by a display component 308. The rendering can be in any perceivable format (e.g., visual, audio). Display component 308 can be configured to retrieve the captured event (or a revised event) from memory 306 or other storage medium.

The user can review the entire rendered event or can search for various portions based on a categorization of particular portions of the event. For example, a previous annotator (including annotations made in real-time or delayed annotations) can edit the video and bracket certain portions of the video. The bracketing of the portions can be a function of a time trigger associated with the video and these portions can be indexed or categorized based on the annotator information (e.g., user that entered the annotation) and/or based on the time the annotations were received. A subsequent user can desire to see only edits made by a specific annotator and, through utilization of the indexing, system 300 can automatically present the user with the portions edited by the selected annotator. In another example, all the edits made a day after the event (or some other time range) might be desired, which can be presented to the user in chronological order or based on some other order.

The user can provide further annotations and/or add content, through interaction with an interface component 310, which can provide a graphical user interface (GUI), a command line interface, a speech interface, Natural Language text interface, and the like. For example, a GUI can be rendered that provides a user with a region or means to load, import, select, read, modify, add, delete, etc. at least a portion of a video, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

User interface 310 can include a playback component 312 that can be configured to provide functions, such as fast forward, rewind, seek and so forth to facilitate transition of movement among the content. The functionality associated with playback component 312 can be selected based on keystrokes, a mouse input, verbal commands, or other means of interacting with system 300.

At substantially the same time as reviewing the video, a user might desire to insert comments. These comments can be keyed off the time stamp located within the video stream and can be accepted by an annotate component 314. The time stamp can be the actual time when the event was captured and/or a time when an annotation was received. For example, a half hour into the video, a user can enter a comment stating, "Pay attention to the next fifteen minutes because this is the most important part." In another example, the user can add the comment, "I have reviewed this video and would like my team to focus on the next twenty minutes that I have bracketed." These comments can be combined with other annotations previously presented, if any, by a revision component 316 to created a revised event, which can be displayed to subsequent viewers.

In accordance with some aspects, a version component 318 is associated with (or accessible by) revision component 316. Version component 318 can be configured to retain the original captured event (which can include automatic annotations captured by system 300) and the one or more revised events. Each revision can be retained as a function of a user the provided the edits, a time the one or more edits were received, or combinations thereof. The version component 318 can interact with memory 306 to retain the original content and its associated versions.

Alternatively or additionally, a rescind component 320 is associated with (or accessible by) annotate component 314. Rescind component 320 can be configured to accept a retraction or cancellation of at least one of the previous edits, or a portion of a previous edit. The revised event (or the original event) can be rewritten so that the retracted portions are no longer included in the latest revised event. The version component 318 and/or memory 306 can retain a copy of the event before (and after) the retraction is applied.

Thus, system 300 can maintain all versions of the event, including the original captured event and any annotations. If a user desires to see a previous version, the desired version can be selected based on a time stamp, annotator information, or based on other parameters.

Figure 4:
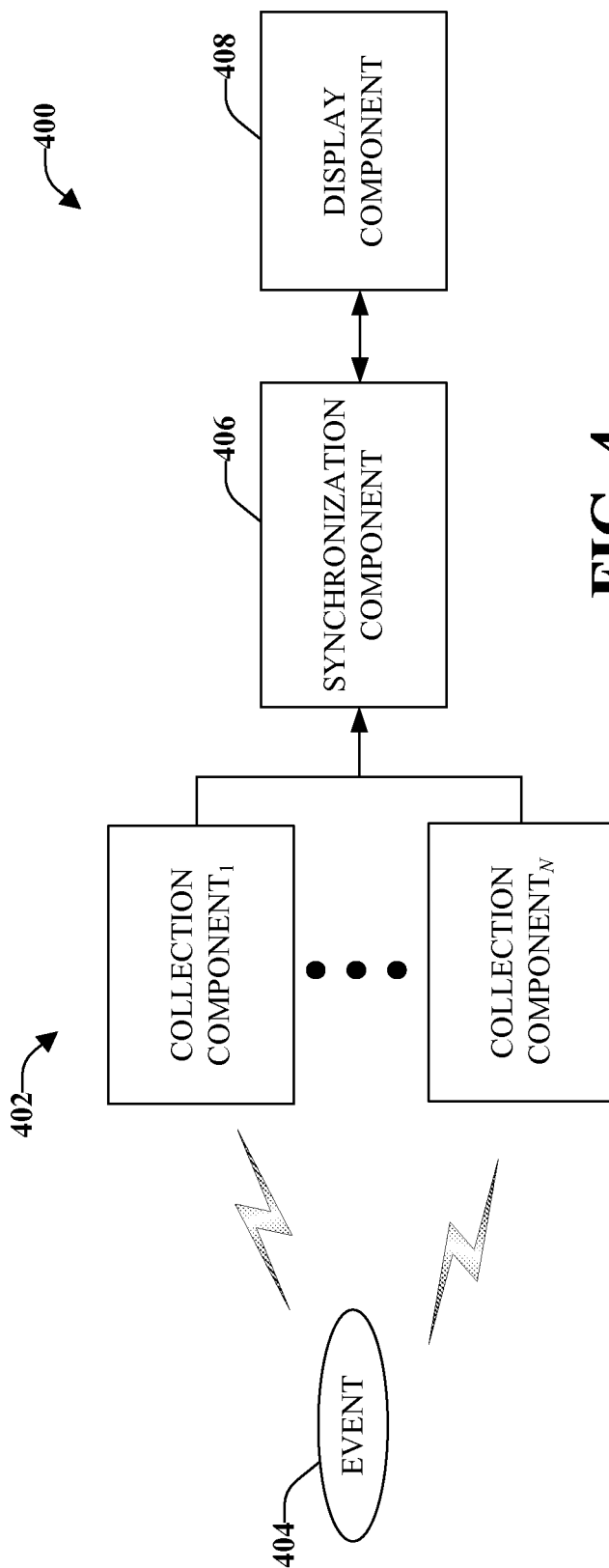
FIG. 4 illustrates a system for capturing an event recorded by a multitude of devices.

FIG. 4 illustrates a system 400 for capturing an event recorded by a multitude of devices. For example, in a stadium a multitude of individuals might take a picture or sound track at substantially the same time. The information from these disparate devices can be synchronized through a time stamp or other technique of coordinating the sampled event.

System 400 includes multiple collection components, labeled collection componet$_1$ through collection component$_N$, where N is an integer, and referred to collectively as collection components 402. Each collection component 402 can be associated with different user devices, cameras, microphones, and/or other recording devices. For example, a user device can be a mobile telephone or other devices (e.g., video camera) with video capabilities. Each collection component 402 can record a different version of a similar event 404. For example, at a family reunion, various family members can record portions of the reunion and each recorded portion can include a timestamp.

The recording obtained by each collection component 402 can be communicated to a synchronization component 406 that can be configured to organize related content based on the time stamps. The synchronization component 406 can receive the multiple video versions (or other versions, such as audio) of the event and organize the multiple versions based on the associated time stamps. Although the images and other information (e.g., audio) obtained by each collection component 402 can be different, based on different perspectives, viewing angles, distance from the target object, and so forth, the images are associated. Based on the time stamps and recognizable features of the captured events, a larger picture, or more comprehensive version, of the event can be provided. Each recording can be indexed by a recording device (e.g., collection component 402) identifier and considered an annotation to a first received recording of the event, wherein each of the captured events are annotated to a first version of the event. The captured recordings can be output through a display component 408 or other user interface component upon request.

System 400 can be utilized in conjunction with the other systems shown and described herein. Thus, as the recordings are available to other users, there might be more versions (e.g., more collection components) made available, such as through a video-wiki or community website. Thus, other users can provide their recordings, which can be annotated to the other recordings in a sequential manner.

It should be noted that the various aspects disclosed herein (e.g., in connection with capturing events, receiving edits to at least a portion of an event (either automatic and/or manual), rewriting the captured event to include the edits, indexing one or more portions of the events and/or edits, rendering the captured event and/or the rewritten events) can employ various machine learning schemes (e.g., artificial intelligence, rules based logic, and so forth) for carrying out various aspects thereof. For example, a process for determining if a particular user has authorization to provide edits or if a particular edit has been provided in an authorized format can be facilitated through an automatic classifier system and process.

Artificial intelligence based systems (e.g., explicitly and/or implicitly trained classifiers) can be employed in connection with performing inference and/or probabilistic determinations and/or statistical-based determinations as in accordance with one or more aspects as described herein. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed aspects.

In view of the exemplary systems shown and described above, methodologies that may be implemented in accordance with the disclosed subject matter, will be better appreciated with reference to the flow charts of the following figures. While, for purposes of simplicity of explanation, the methodologies are shown and described as a series of blocks, it is to be understood and appreciated that the disclosed aspects are not limited by the number or order of blocks, as some blocks may occur in different orders and/or concurrently with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
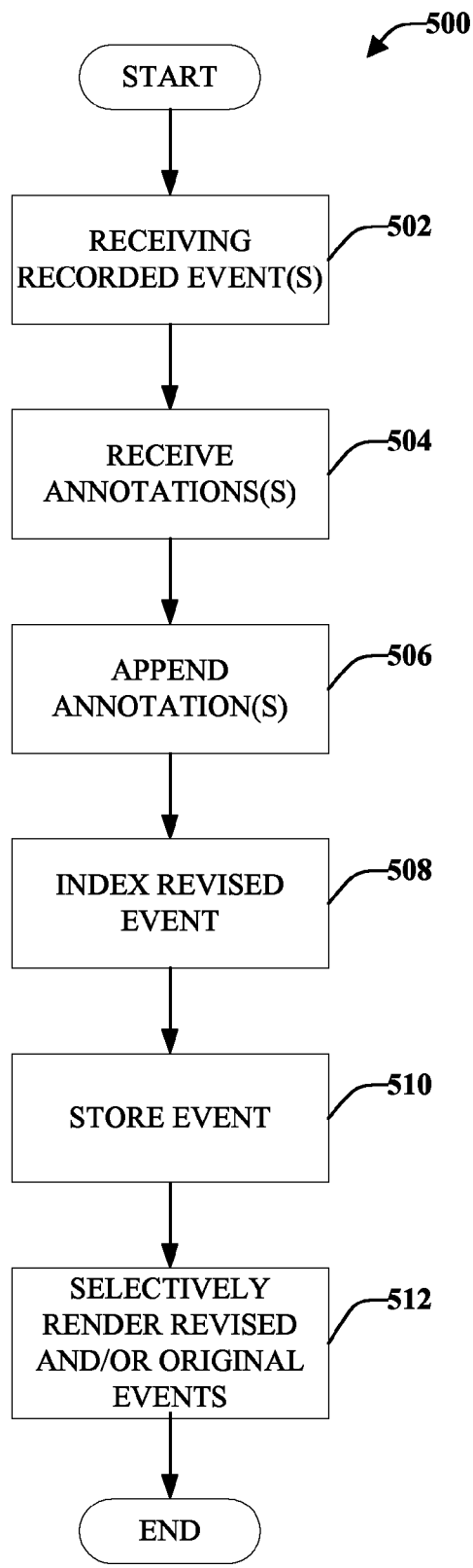
FIG. 5 illustrates a method for recording events and annotating and indexing information to the events at the time of recording or any time after recording.

FIG. 5 illustrates a method 500 for recording events and annotating and indexing information to the events at the time of recording or any time after recording. Method 500 starts, at 502, with receiving a recording of an event (e.g., captured event), which can be any business or personal event (e.g., meeting, presentation, family holiday, classroom instruction, and so on).

At 504, an annotation (e.g., edit) relating to the recorded event is received. The annotations can be additions to the captured events, modifications to a portion of the captured event, and/or deletions to at least another portion of the captured event. The edit can be automatically received at substantially the same time as the event is recorded. Automatic edits can be applied based on a trigger, such as key words or key phrases, text, body language, hand gestures, and so forth. Additionally or alternatively, the edits can be manually received. For example, a participant in the event might desire to manually highlight or flag a particular segment or portion for subsequent viewers. Additionally or alternatively, the event can be edited at a later time, such as when one or more users view the event (which can include original participants at the event). A subsequent viewer can input questions and, later, another viewer can provide answers. The subsequent viewer might also provide additional information and/or other information, comments, questions, and so forth that might be of interest to others.

The annotations received after the event can be appended to the original event (which can include annotations applied at substantially the same time as the event is captured), at 506, to produce a revised event (e.g., original event and later annotations). At 508, the revised event is indexed with information relating to the user that entered the annotation (e.g., annotator), a date/time the annotation was made (e.g., time stamp), a revision level or number (e.g., how many annotations or revised events were made), or combinations thereof, as well as other information. At 510, the at least one captured event and the revised event (including annotations and indexing) is stored or maintained in a readily retrievable format. The original captured event and/or one or more revised events are displayed, at 512, based upon a received request to view the event(s).

In accordance with some aspects, that original event is also annotated and indexed based on various information. The indexing to the original event can be based on a participant the contributed the information, based on the type of subject matter, based on a team name, based on triggers or cues, and so forth. The annotations can be real-time annotations (both automatic and manual) made during the event (e.g., posting a notice that more information about the current topic is needed, and so forth).

Figure 6:
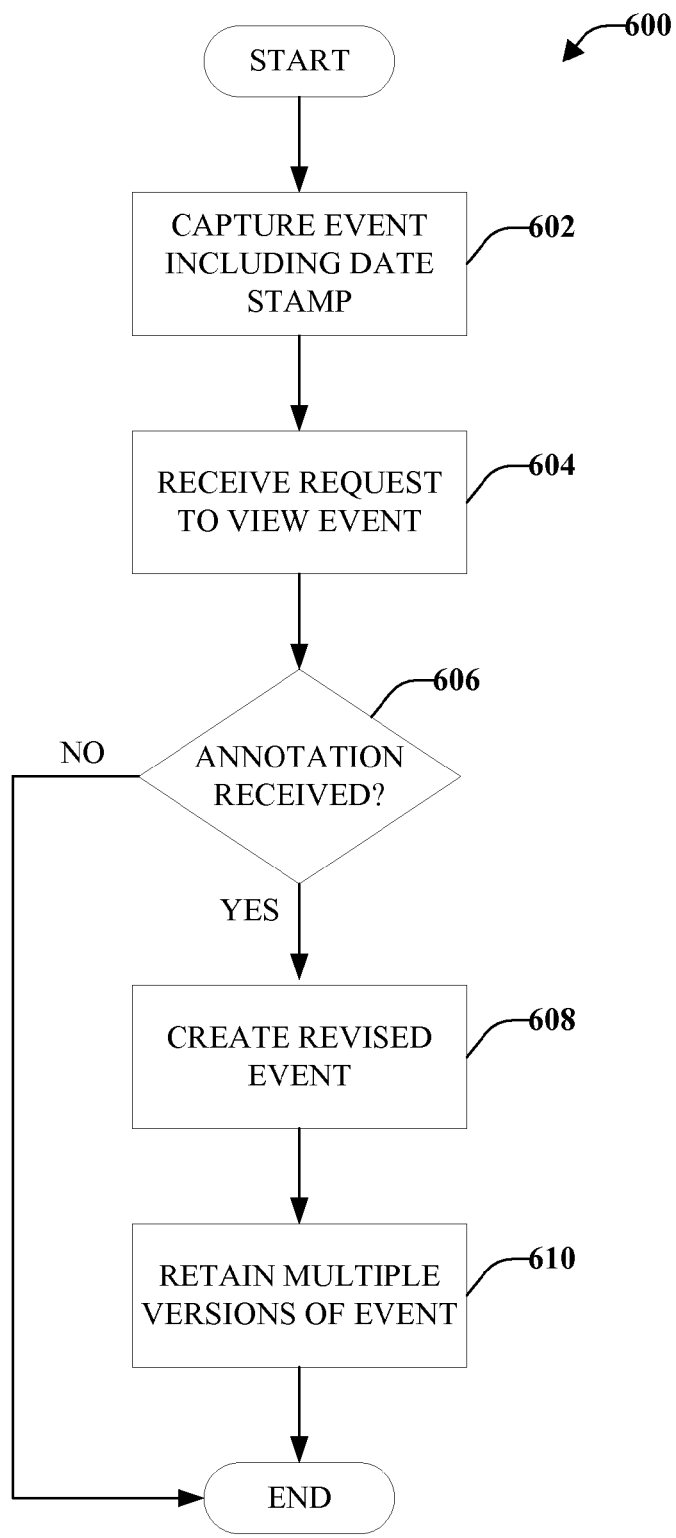
FIG. 6 illustrates a method for providing a video wiki with which multiple users can interact.

FIG. 6 illustrates a method 600 for providing a video-wiki with which multiple users can interact. Method 600 starts, at 602, when an event and a time stamp associated with the event are captured by video. The event can be any event that might be of interest to one or more users. The time stamp provides a reference for the multiple sections of the video content. At substantially the same time as the event is captured automatic annotations and/or manual annotations can be applied to the event.

At 604, a request to view the content is received. The request can be to view the entire content or at least a portion of the content. The request can be based on various factors, including a name of the video, a contributor (e.g., annotator), a time stamp associated with the video, or based on other categorizations (e.g., subject matter, key words or phrases, and so forth). The content requested (e.g., original event, one or more revised events) can be rendered based upon the request.

A determination is made, at 606, as to whether an annotation (e.g., additional content, modifications, deletions) to the rendered content is received. The annotations can be additions to the captured event, modifications to at least a portion of the captured event, deletions to at least a portion of the captured event, or combinations thereof. The annotations can be in various formats including video format, audio format, text format, or combinations thereof. If an annotation to the rendered content is not received ("NO"), method 600 can end until another request to view content is received and/or until receipt of an annotation. If the determination is that an annotation to the rendered content is received ("YES"), at 608, a revised event is created. The revised event can include the original event or a previously revised event and can include the annotations detected or received, at 606.

In accordance with some aspects, at 606, an annotation can be received, however, the user providing the annotation does not have the authority to annotate the event and/or the revised event. Thus, at least a portion of the captured event or at least a portion of one or more revised events can be locked to restrict access to one or more selected users, to restrict edits to a particular format (e.g., only verbal edits allowed), or combinations thereof. If the user is locked out and/or if the type of format is not compatible with what is allowed, an error message can be provided indicating that the annotations will not be applied. The message can include the reason(s) why the annotation is not allowed.

Multiple versions of the event are maintained, at 610. The multiple versions can include the original event and each subsequent revised event. Thus, a user can search through the maintained events to view an earlier revision and/or to view the original event. The multiple versions can be retained in a storage media in any retrievable format.

Figure 7:
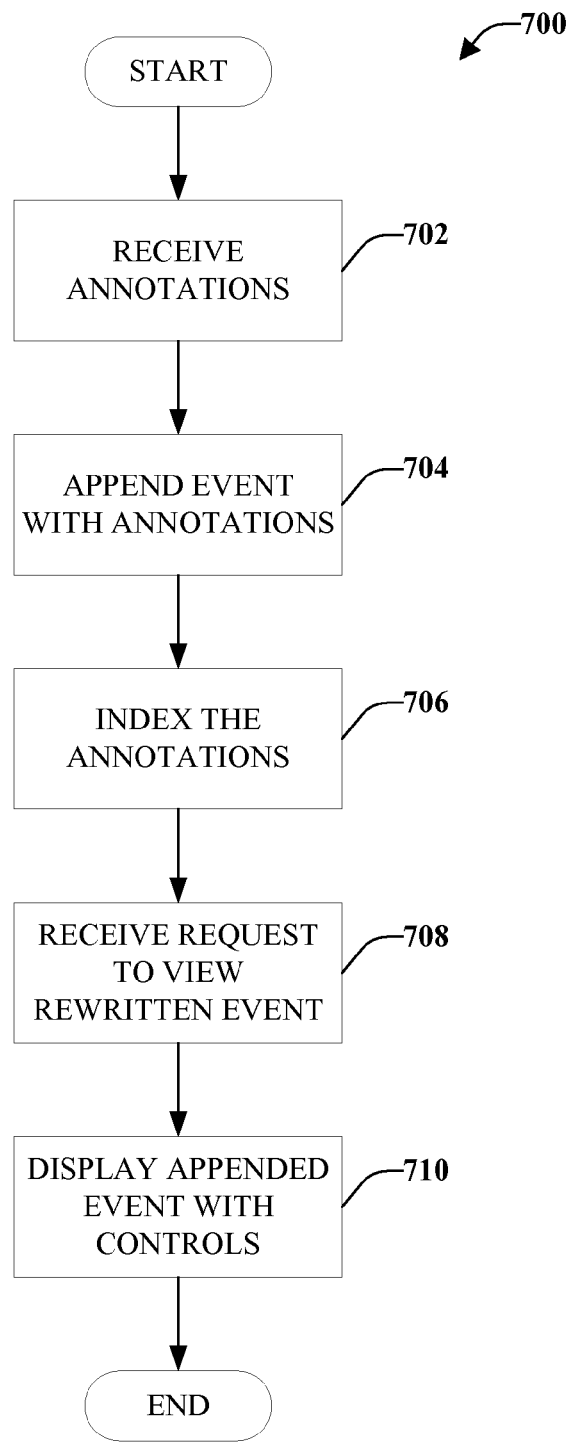
FIG. 7 illustrates a method for auto-generation of events with annotation and indexing.

FIG. 7 illustrates a method 700 for auto-generation of events with annotation and indexing. Annotations are received, at 702. The annotations can be received based on a captured event and/or revised events that are rendered upon request. The annotations can be intended to be combined with an original event or with a previously revised event. At 704, an original (or revised) event is appended or rewritten to include the received annotations. The annotations can be indexed based on an identification of the annotator, a time stamp, a revision level and/or other categories, at 706. The indexed annotations can be retained in a storage medium.

At 708, a request to review the rewritten event can be received. The annotated event is retrieved and presented, at 710, with controls that provide functionality to facilitate transition of movement within the content. The functionality can include actions, such as fast forward, rewind, seek, stop, and the like. This functionality can allow a user to quickly access the desired content, portions of the content, and/or to search for a particular speaker, subject matter, time, or other criteria.

Figure 8:
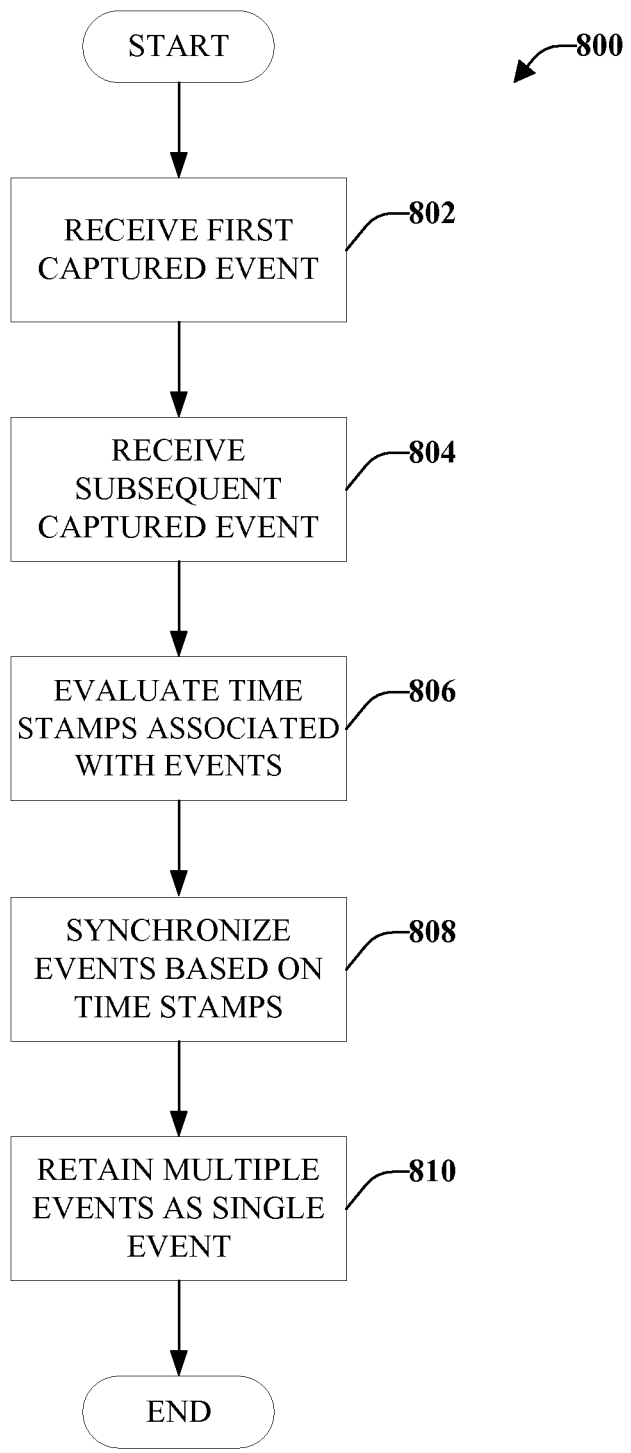
FIG. 8 illustrates a method for capturing an event recorded by a multitude of devices.

FIG. 8 illustrates a method 800 for capturing an event recorded by a multitude of devices. Capturing of an event from multiple devices might be desirable to allow greater detail or depth of coverage of that event. The multiple devices can be utilized for recording the event and the output of the devices can be combined to achieve a unified event.

Method 800 starts, at 802, when a first captured event is received. This first captured event can include a time stamp associated with the various portions of the event. At 804, a subsequent captured event is received that is substantially similar to the first captured event. The similarities can be made based on a location of the devices at the time the event was captured and/or based on a manual indication (e.g., user input) of the location, or based on other parameters. It should be noted that any number of subsequent captured events can be received, at 804.

The time stamps associated with each of the received captured events are evaluated, at 806. This evaluation can determine whether the events cover similar times and/or areas and, therefore, most likely captured substantially the same event. At 808, two or more events or portions of the events are synchronized based in part on the time stamps. In some situations, only a portion of two or more events might encompass an overlapping time period. For example, a first device might start capturing an event and then a few seconds later a second device begins to capture the same event. In this situation, the first few seconds recorded by the first device do not synchronize with the second device and only the events recorded by the first device are utilized for those few seconds. At 810, the different captured events are maintained in a storage media for subsequent viewing and/or editing in accordance with the disclosed aspects.

Figure 9:
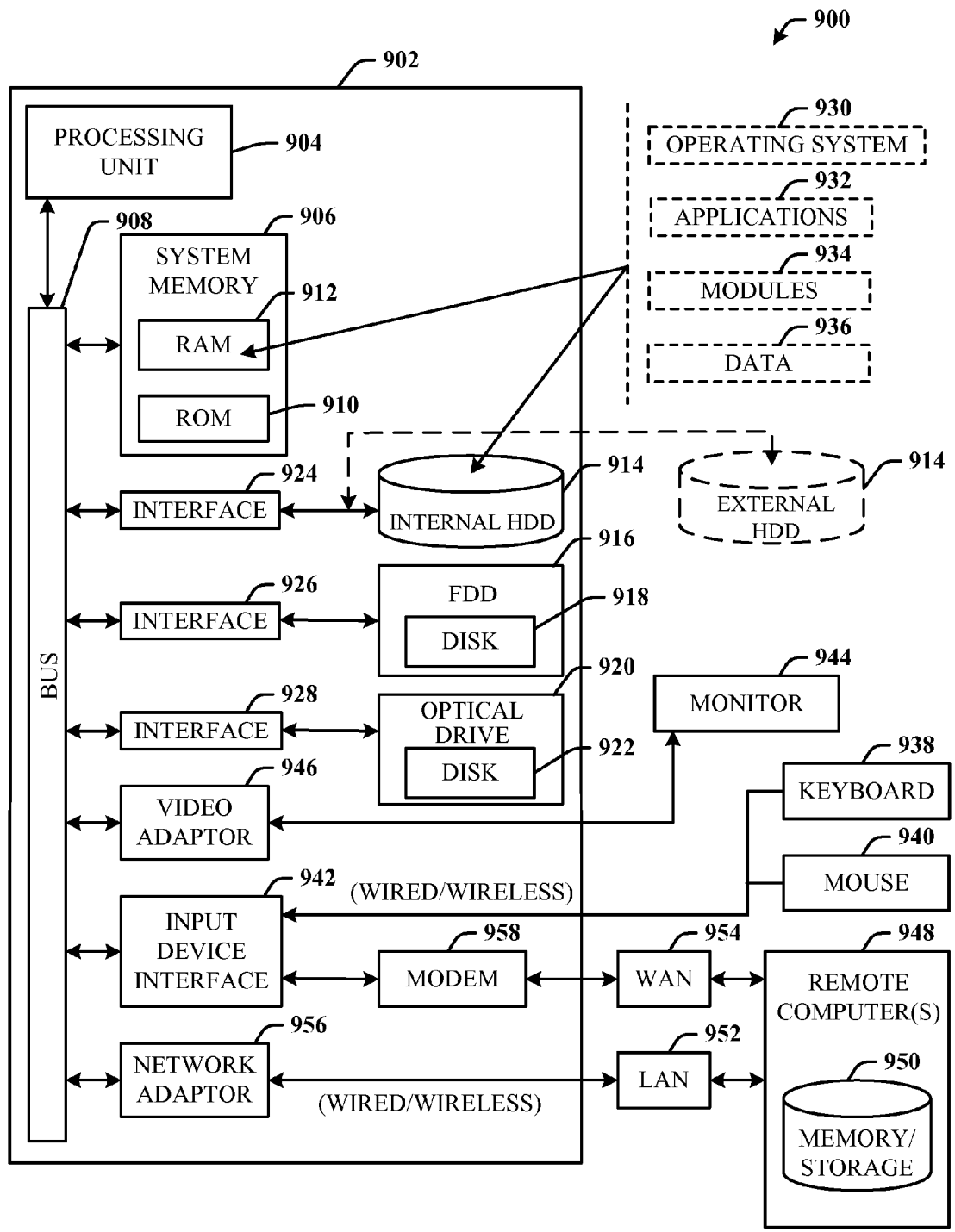
FIG. 9 illustrates a block diagram of a computer operable to execute the disclosed aspects.

Referring now to FIG. 9, there is illustrated a block diagram of a computer operable to execute the disclosed architecture. In order to provide additional context for various aspects disclosed herein, FIG. 9 and the following discussion are intended to provide a brief, general description of a suitable computing environment 900 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 912, including an operating system 930, one or more application programs 932, other program modules 934 and program data 936. All or portions of the operating system, applications, modules, and/or data can also be cached in the RAM 912. It is appreciated that the various aspects can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 through an interface, such as a video adapter 946. In addition to the monitor 944, a computer typically includes other peripheral output devices (not shown), such as speakers, printers, etc.

The computer 902 may operate in a networked environment using logical connections through wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 through the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
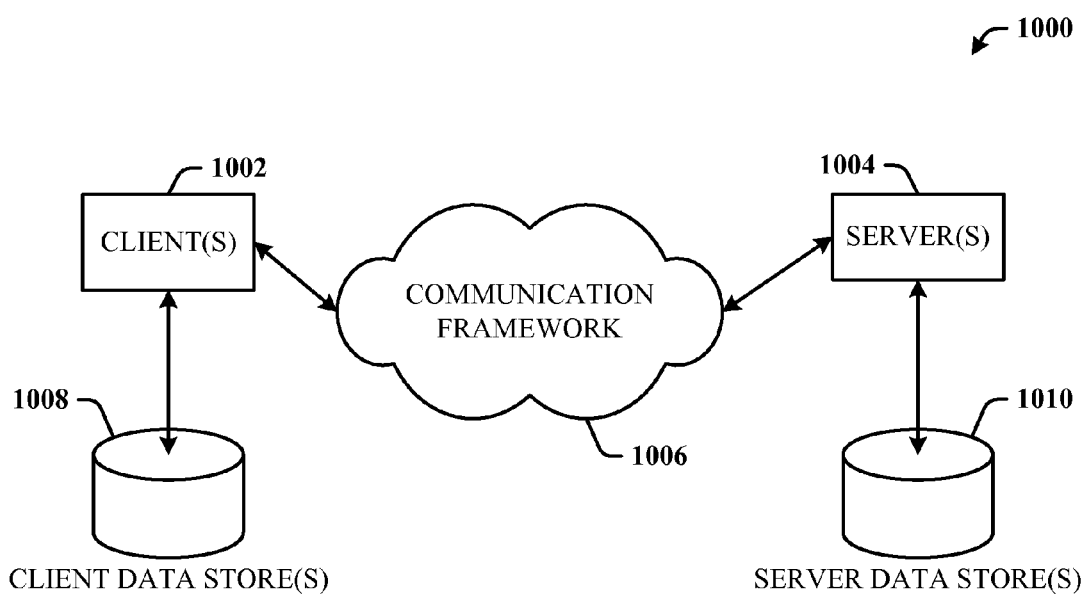
FIG. 10 illustrates a schematic block diagram of an exemplary computing environment operable to execute the disclosed aspects.

Referring now to FIG. 10, there is illustrated a schematic block diagram of an exemplary computing environment 1000 in accordance with the various aspects. The system 1000 includes one or more client(s) 1002. The client(s) 1002 can be hardware and/or software (e.g., threads, processes, computing devices). The client(s) 1002 can house cookie(s) and/or associated contextual information by employing the various aspects, for example.

The system 1000 also includes one or more server(s) 1004. The server(s) 1004 can also be hardware and/or software (e.g., threads, processes, computing devices). The servers 1004 can house threads to perform transformations by employing the various aspects, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated through a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. One or more hardware computer-storage media storing computer-executable instructions that, when executed by one or more computers, cause the one or more computers to perform acts comprising:
capturing a video version of a meeting having a plurality of participants including a speaker and other participants, the captured video version of the meeting including an indicator comprising one or more of a gesture by the speaker, a keyword spoken by the speaker, or body language of the speaker;
automatically distinguishing among the plurality of participants in the meeting to identify the speaker in the captured video version of the meeting, wherein the automatically distinguishing comprises performing facial recognition to distinguish the speaker from the other participants in the meeting;
recognizing the indicator in a portion of the captured video version of the meeting;
automatically applying one or more edits to the captured video version of the meeting based on the gesture by the speaker, the keyword spoken by the speaker, or the body language of the speaker, the one or more edits being applied based on a rule associated with the gesture, the keyword, or the body language; and
combining the one or more edits and the captured video version of the meeting to rewrite the captured video version of the meeting into a revised video version of the meeting.

2. The one or more hardware computer-storage media according to claim 1, the acts further comprising:
performing speech recognition to distinguish the speaker from the other participants in the meeting.

3. The one or more hardware computer-storage media according to claim 1, wherein the indicator comprises the body language of the speaker and the body language comprises the speaker leaving a room where the meeting is taking place.

4. The one or more hardware computer-storage media according to claim 3, wherein the one or more edits indicate that a break in the meeting occurs when the speaker leaves the room where the meeting is taking place.

5. The one or more hardware computer-storage media according to claim 1, the acts further comprising:
stopping or pausing the capturing of the video version of the meeting responsive to the gesture, the keyword, or the body language, wherein the gesture, the keyword, or the body language identifies a break in the meeting.

6. The one or more hardware computer-storage media according to claim 5, the acts further comprising:
automatically restarting the capturing of the video version of the meeting responsive to determining that the speaker has restarted the meeting.

7. The one or more hardware computer-storage media according to claim 1, wherein the edits are applied while the video version of the meeting is being captured.

8. The one or more hardware computer-storage media according to claim 1, wherein the edits are applied after the meeting has been captured.

9. A system comprising:
at least one processing unit; and
at least one computer storage media storing computer-executable instructions that, when executed by the processing unit, cause the processing unit to:
obtain a captured video version of a meeting having a plurality of participants including a speaker and other participants, the captured video version of the meeting including an indicator comprising one or more of a gesture by the speaker, a keyword spoken by the speaker, or body language of the speaker;
identify the speaker in the captured video version of the meeting by automatically distinguishing the speaker from the other participants in the meeting using speech recognition;
recognize the indicator in a portion of the captured video version of the meeting;
automatically apply one or more edits to the captured video version of the meeting based on the gesture by the speaker, the keyword spoken by the speaker, or the body language of the speaker, the one or more edits being applied based on a rule associated with the gesture, the keyword, or the body language; and
combine the one or more edits and the captured video version of the meeting to rewrite the captured video version of the meeting into a revised video version of the meeting.

10. The system of claim 9, wherein the computer-executable instructions further cause the at least one processing unit to:
perform facial recognition in addition to the speech recognition to distinguish the speaker from the other participants in the meeting.

11. The system of claim 9, wherein the computer-executable instructions further cause the at least one processing unit to:
  accept a retraction of an individual edit; and
  rewrite the revised video version of the meeting without the individual edit.

12. The system of claim 11, wherein the computer-executable instructions further cause the at least one processing unit to:
  retain a copy of the revised video version of the meeting that includes the individual edit that was retracted.

13. The system of claim 9, wherein the computer-executable instructions further cause the at least one processing unit to:
  stop or pause capture of the video version of the meeting responsive to recognizing the indicator.

14. The system of claim 9, wherein the computer-executable instructions further cause the at least one processing unit to:
  stop or pause capturing of the video version of the meeting responsive to another indicator indicating that the speaker or the other participants are leaving a room where the meeting is taking place.

15. The system of claim 14, wherein the computer-executable instructions further cause the at least one processing unit to:
  restart capturing of the video version of the meeting responsive to recognizing that the speaker or the other participants have returned to the room where the meeting is taking place.

16. A method performed by at least one computer processing unit, the method comprising:
  obtaining a captured video version of a meeting having a plurality of participants including a speaker and other participants, the captured video version of the meeting including an indicator comprising one or more of a gesture by the speaker, a keyword spoken by the speaker, or body language of the speaker;
  automatically distinguishing among the plurality of participants in the meeting to identify the speaker in the captured video version of the meeting, wherein the automatically distinguishing comprises performing at least one of speech recognition or facial recognition to distinguish the speaker from the other participants in the meeting;
  recognizing the indicator in a portion of the captured video version of the meeting;
  automatically applying one or more edits to the captured video version of the meeting based on the gesture by the speaker, the keyword spoken by the speaker, or the body language of the speaker, the one or more edits being applied based on a rule associated with the gesture, the keyword, or the body language; and
  combining the one or more edits and the captured video version of the meeting to rewrite the captured video version of the meeting into a revised video version of the meeting.

17. The method of claim 16, wherein obtaining the video version of the meeting comprises capturing the video version of the meeting.

18. The method of claim 16, wherein the automatically distinguishing comprises performing the speech recognition.

19. The method of claim 16, wherein the automatically distinguishing comprises performing the facial recognition.

20. The method of claim 16, wherein the indicator comprises the keyword, the keyword indicates that the meeting has reached a conclusion, and an individual edit identifies the conclusion of the meeting.

* * * * *